US012730429B2

(12) United States Patent
Yoshimura et al.

(10) Patent No.: US 12,730,429 B2
(45) Date of Patent: Sep. 8, 2026

(54) INFORMATION PROCESSING APPARATUS, PLANT CONTROL METHOD, AND NON-TRANSITORY COMPUTER-READABLE RECORDING MEDIUM

(71) Applicant: Yokogawa Electric Corporation, Tokyo (JP)

(72) Inventors: Eirou Yoshimura, Tokyo (JP); Kan-E Kuriyama, Tokyo (JP); Isao Hirooka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 594 days.

(21) Appl. No.: 18/174,775

(22) Filed: Feb. 27, 2023

(65) Prior Publication Data

US 2023/0324876 A1 Oct. 12, 2023

(30) Foreign Application Priority Data

Mar. 30, 2022 (JP) ................................ 2022-057324

(51) Int. Cl.
*G05B 19/40* (2006.01)
*G05B 19/4063* (2006.01)
*G05B 19/4065* (2006.01)

(52) U.S. Cl.
CPC ..... *G05B 19/4065* (2013.01); *G05B 19/4063* (2013.01)

(58) Field of Classification Search
CPC ........... G05B 19/4065; G05B 19/4063; G05B 19/0426; G05B 23/0286; G05B 19/4183; G05B 19/41835; G06F 21/604; G06F 21/6218; G06F 2221/2113; G06F 2221/2141; G16Y 10/25; G16Y 10/90;
(Continued)

(56) References Cited

U.S. PATENT DOCUMENTS

2003/0009311 A1* 1/2003 Ushiku .................. F04D 19/04 702/184
2010/0250542 A1* 9/2010 Fujimaki ............... G06N 20/10 707/E17.089

(Continued)

FOREIGN PATENT DOCUMENTS

EP 3074824 B1 5/2019
JP 2002-32274 A 1/2002

(Continued)

OTHER PUBLICATIONS

Notice of Reasons for Refusal issued in corresponding Japanese Application No. 2022-057324 mailed Dec. 19, 2023 (5 pages).

(Continued)

*Primary Examiner* — Christopher W Carter
(74) *Attorney, Agent, or Firm* — Osha Bergman Watanabe & Burton LLP

(57) ABSTRACT

An information processing apparatus includes: a processor that: acquires, from a device for an operation of a plant, data that is related to the operation of the plant and to which one of pieces of attribute information indicating a state of the device has been assigned; classifies the acquired data into one of the pieces of attribute information based on the attribute information assigned to the acquired data; and operates the plant by using the data classified into one of the pieces of attribute information.

3 Claims, 11 Drawing Sheets

(58) Field of Classification Search
CPC ........ G16Y 20/00; G16Y 20/10; G16Y 20/20; G16Y 30/10; G16Y 40/10; G16Y 40/20; G16Y 40/35; G16Y 40/40; G16Y 40/50
See application file for complete search history.

(56) References Cited

U.S. PATENT DOCUMENTS

| | | | | |
|---|---|---|---|---|
| 2010/0308119 | A1* | 12/2010 | Steinberg | F24F 11/30 236/51 |
| 2018/0224809 | A1* | 8/2018 | Liu | G05B 19/4183 |
| 2019/0018374 | A1* | 1/2019 | Kanokogi | G05B 13/0265 |
| 2020/0012269 | A1* | 1/2020 | Hori | G06Q 10/04 |
| 2023/0019594 | A1 | 1/2023 | Takada et al. | |

FOREIGN PATENT DOCUMENTS

| | | | |
|---|---|---|---|
| JP | 2020-64674 | A | 4/2020 |
| JP | 2021-57894 | A | 4/2021 |
| JP | 2021-149569 | A | 9/2021 |
| WO | 2021/138613 | A2 | 7/2021 |

OTHER PUBLICATIONS

Office Action issued in corresponding Chinese Patent Application No. 202310180654.6, dated Nov. 26, 2025, with translation (22 pages).

Office Action issued in corresponding Chinese Patent Application No. 202310180654.6, dated May 10, 2026, with translation (14 pages).

* cited by examiner

1
INTEGRATED MANAGEMENT SYSTEM
REMOTE OPERATION ENVIRONMENT
DECISION MAKING SUPPORT
INTEGRATED OPERATION MONITORING ENVIRONMENT OF ENTIRE PLANT
10
CI SERVER
N
5
PLANT
EQUIP-MENT
FIELD DEVICE
SENSOR
5a
5b
5c
5
PLANT
EQUIP-MENT
FIELD DEVICE
SENSOR
5a
5b
5c
5
PLANT
EQUIP-MENT
FIELD DEVICE
SENSOR
5a
5b
5c

| ATTRIBUTE INFORMATION | DEVICE INFORMATION | PLANT INFORMATION |
|---|---|---|
| S-A1 ~ | SENSOR | PLANT A |
| S-B1 ~ | | PLANT B |
| ... | | PLANT C |
| A-A1 ~ | EQUIPMENT | PLANT A |
| ... | ... | ... |
| D-A1 ~ | DEVICE | PLANT D |
| ... | ... | ... |

FIG.5

| PLANT INFORMATION | SECURITY LEVEL | ACCESS LIMITATION |
|---|---|---|
| PLANT A | HIGH | WRITE, READ |
| PLANT B | LOW | READ |
| ... | ... | ... |

FIG.6

| ATTRIBUTE INFORMATION | SECURITY LEVEL |
|---|---|
| S-SA10 | HIGH |
| C2000 | MEDIUM |
| ... | ... |

FIG.7

| SECURITY LEVEL | PROVISION DESTINATION | PERMISSION CONTENT |
|---|---|---|
| HIGH | WITHIN SAME PLANT | READ ONLY |
| MEDIUM | INTEGRATED MONITORING | READ AND PROVIDE EXTERNALLY |
| ... | ... | ... |

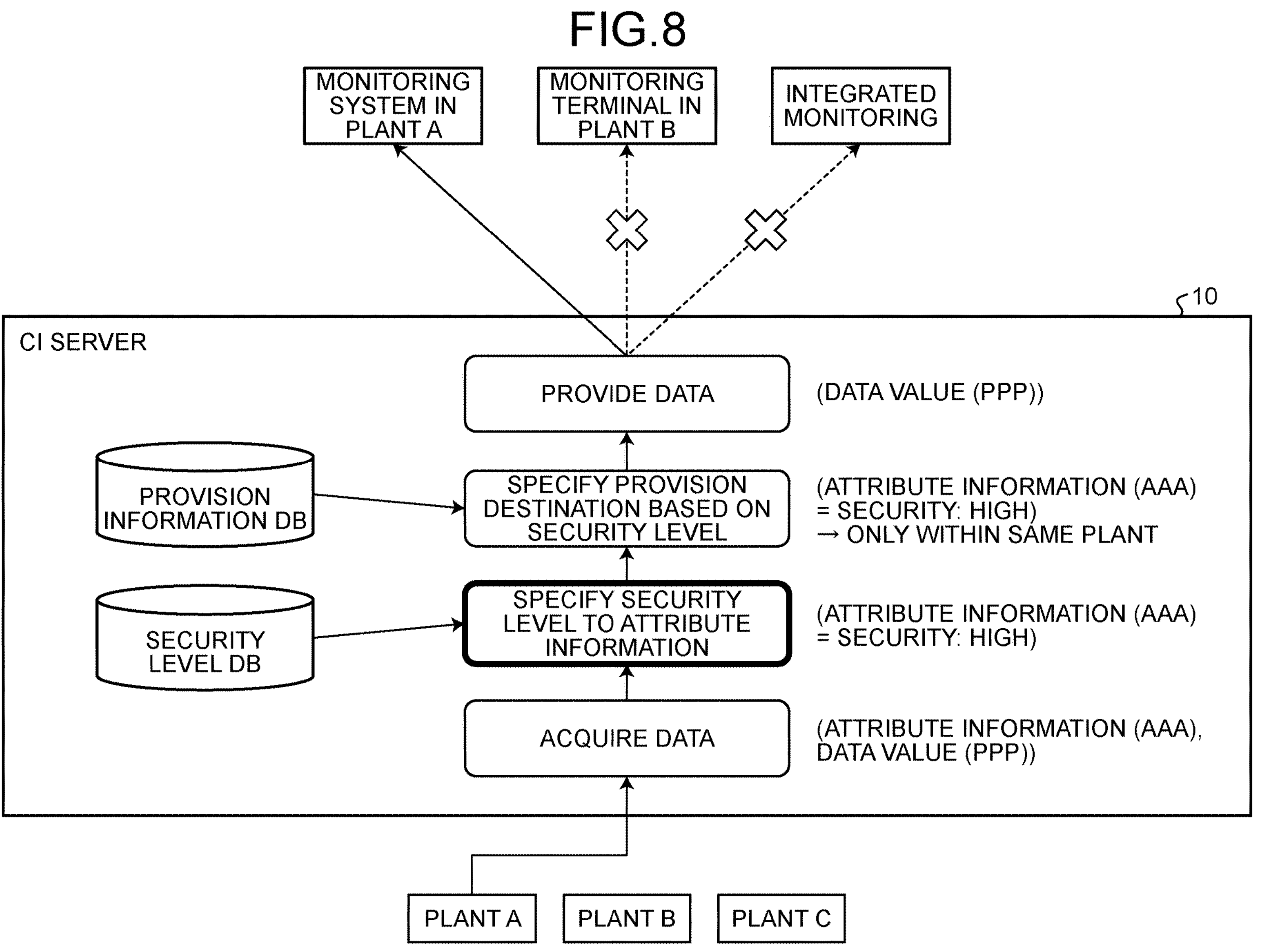
FIG.8
MONITORING SYSTEM IN PLANT A
MONITORING TERMINAL IN PLANT B
INTEGRATED MONITORING
10
CI SERVER
PROVIDE DATA
(DATA VALUE (PPP))
PROVISION INFORMATION DB
SPECIFY PROVISION DESTINATION BASED ON SECURITY LEVEL
(ATTRIBUTE INFORMATION (AAA) = SECURITY: HIGH) → ONLY WITHIN SAME PLANT
SECURITY LEVEL DB
SPECIFY SECURITY LEVEL TO ATTRIBUTE INFORMATION
(ATTRIBUTE INFORMATION (AAA) = SECURITY: HIGH)
ACQUIRE DATA
(ATTRIBUTE INFORMATION (AAA), DATA VALUE (PPP))
PLANT A
PLANT B
PLANT C

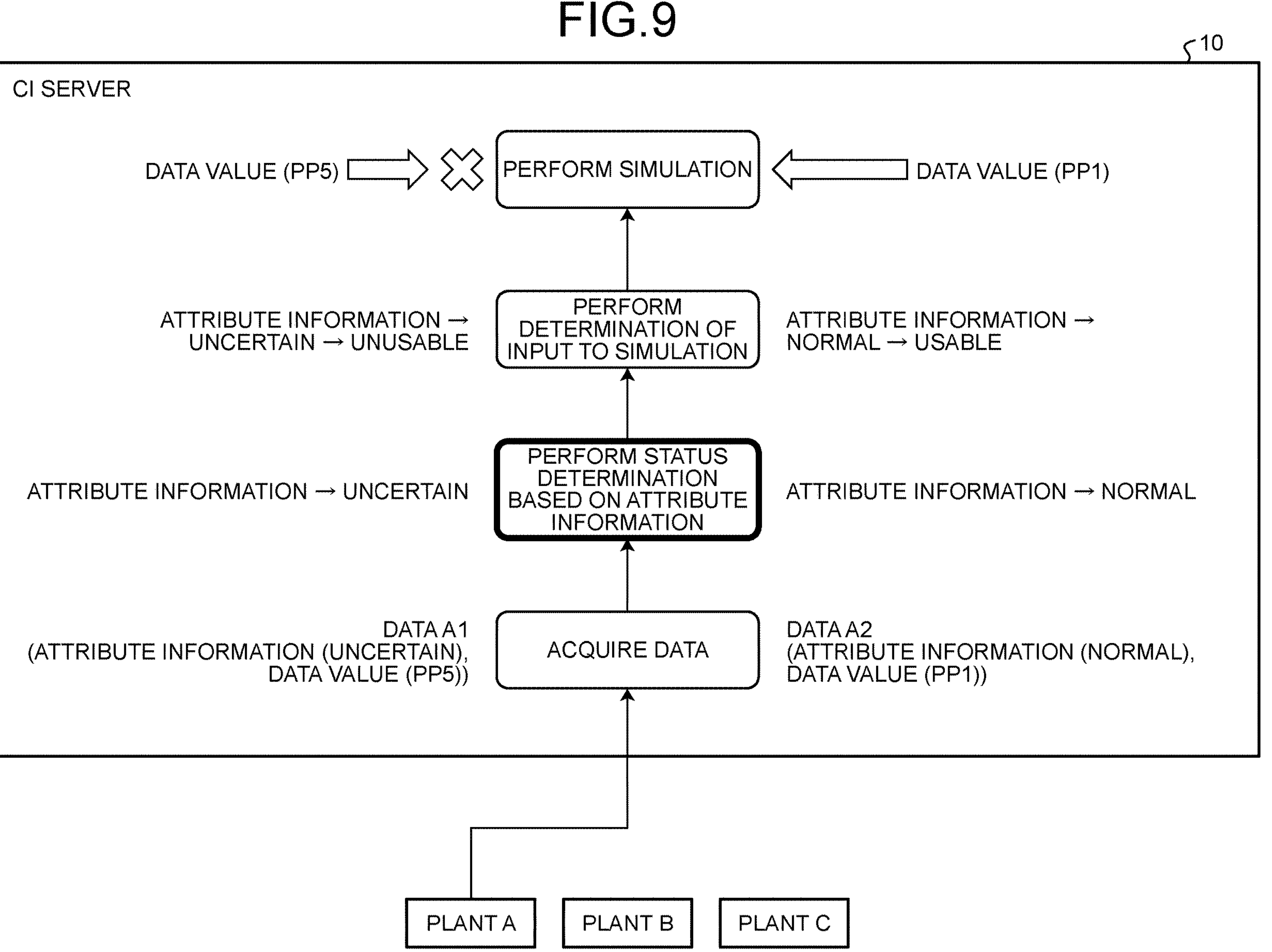
FIG.9
10
CI SERVER
DATA VALUE (PP5)
PERFORM SIMULATION
DATA VALUE (PP1)
ATTRIBUTE INFORMATION → UNCERTAIN → UNUSABLE
PERFORM DETERMINATION OF INPUT TO SIMULATION
ATTRIBUTE INFORMATION → NORMAL → USABLE
ATTRIBUTE INFORMATION → UNCERTAIN
PERFORM STATUS DETERMINATION BASED ON ATTRIBUTE INFORMATION
ATTRIBUTE INFORMATION → NORMAL
DATA A1 (ATTRIBUTE INFORMATION (UNCERTAIN), DATA VALUE (PP5))
ACQUIRE DATA
DATA A2 (ATTRIBUTE INFORMATION (NORMAL), DATA VALUE (PP1))
PLANT A
PLANT B
PLANT C

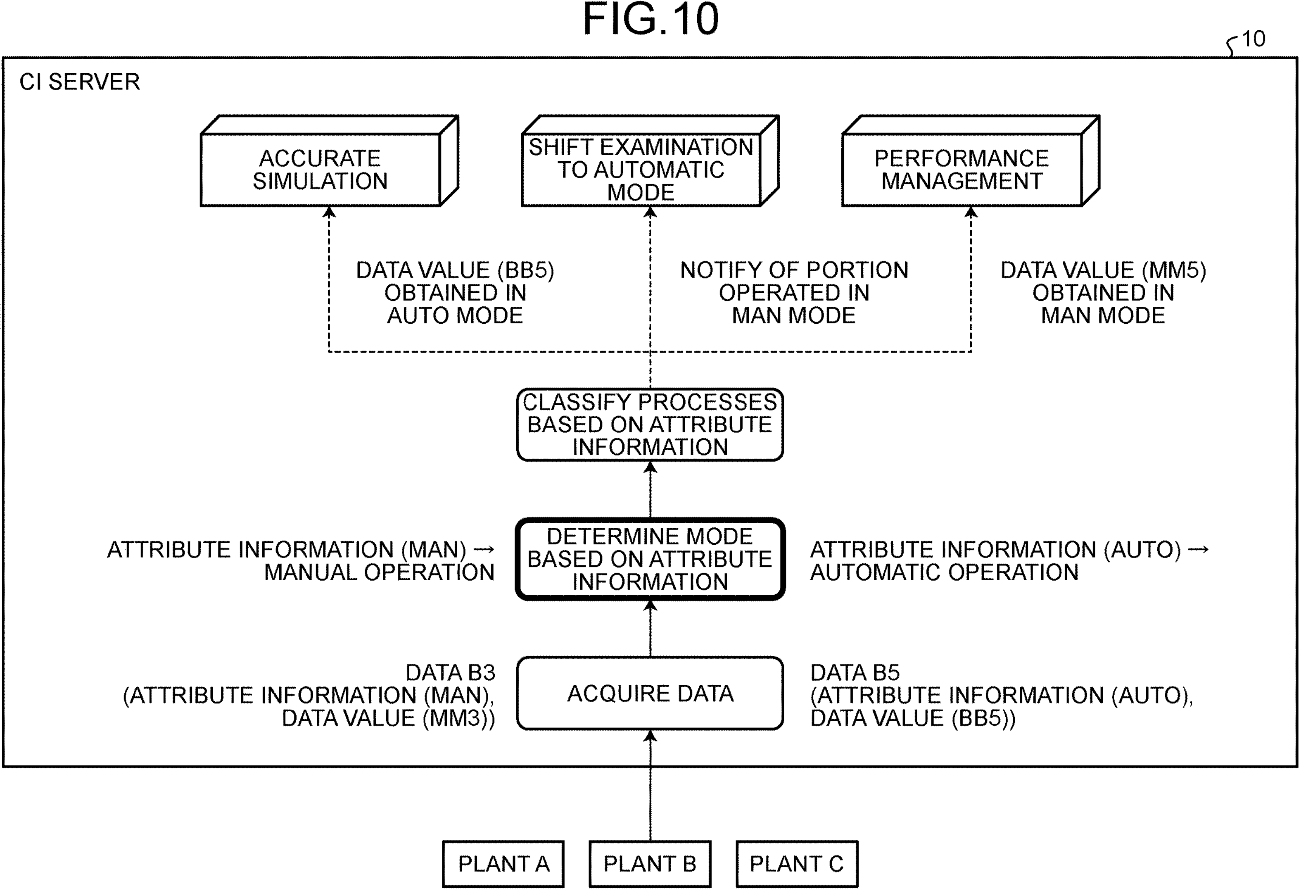
FIG.10
10
CI SERVER
ACCURATE SIMULATION
SHIFT EXAMINATION TO AUTOMATIC MODE
PERFORMANCE MANAGEMENT
DATA VALUE (BB5) OBTAINED IN AUTO MODE
NOTIFY OF PORTION OPERATED IN MAN MODE
DATA VALUE (MM5) OBTAINED IN MAN MODE
CLASSIFY PROCESSES BASED ON ATTRIBUTE INFORMATION
ATTRIBUTE INFORMATION (MAN) → MANUAL OPERATION
DETERMINE MODE BASED ON ATTRIBUTE INFORMATION
ATTRIBUTE INFORMATION (AUTO) → AUTOMATIC OPERATION
DATA B3 (ATTRIBUTE INFORMATION (MAN), DATA VALUE (MM3))
ACQUIRE DATA
DATA B5 (ATTRIBUTE INFORMATION (AUTO), DATA VALUE (BB5))
PLANT A
PLANT B
PLANT C

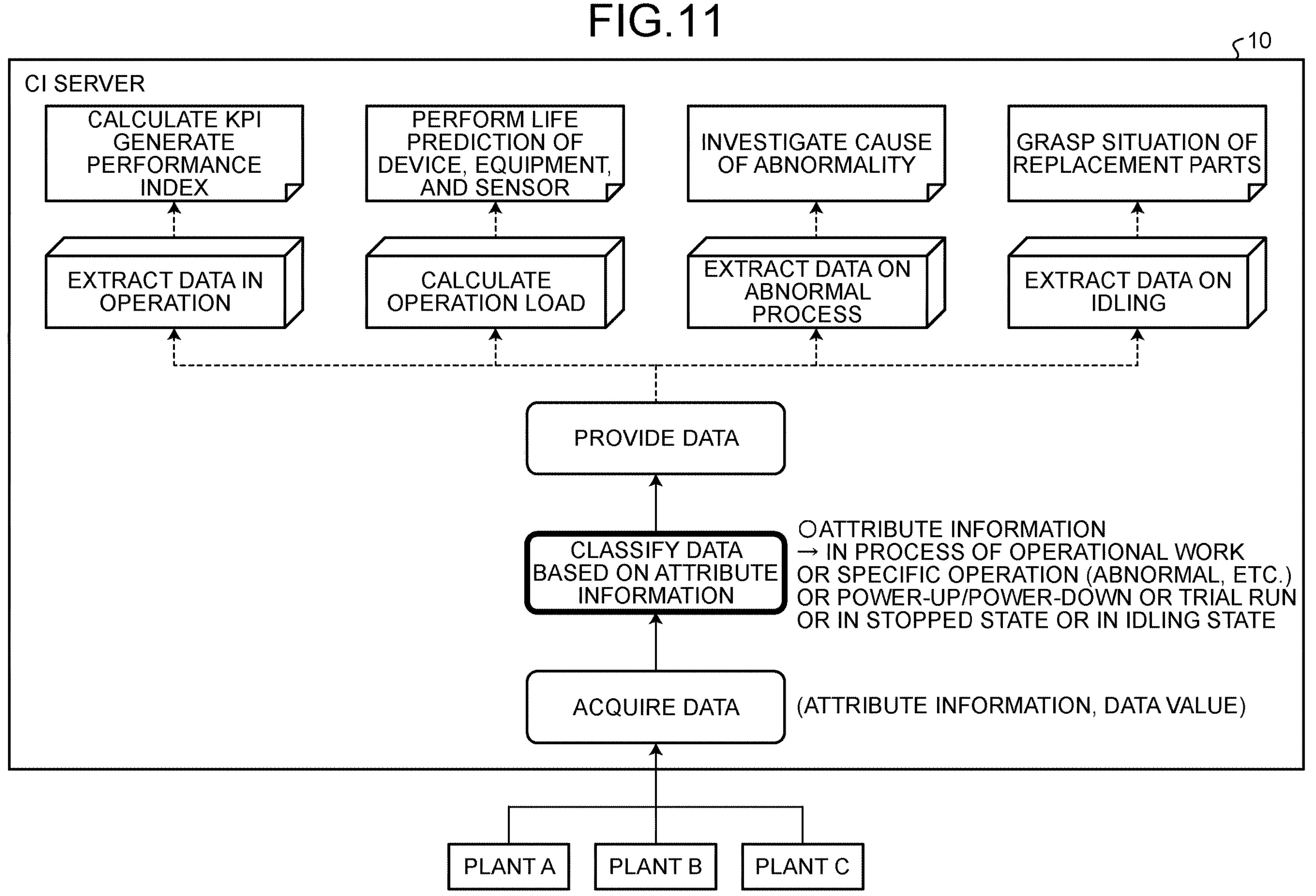
FIG.11
10
CI SERVER
CALCULATE KPI GENERATE PERFORMANCE INDEX
PERFORM LIFE PREDICTION OF DEVICE, EQUIPMENT, AND SENSOR
INVESTIGATE CAUSE OF ABNORMALITY
GRASP SITUATION OF REPLACEMENT PARTS
EXTRACT DATA IN OPERATION
CALCULATE OPERATION LOAD
EXTRACT DATA ON ABNORMAL PROCESS
EXTRACT DATA ON IDLING
PROVIDE DATA
CLASSIFY DATA BASED ON ATTRIBUTE INFORMATION
○ATTRIBUTE INFORMATION
→ IN PROCESS OF OPERATIONAL WORK
OR SPECIFIC OPERATION (ABNORMAL, ETC.)
OR POWER-UP/POWER-DOWN OR TRIAL RUN
OR IN STOPPED STATE OR IN IDLING STATE
ACQUIRE DATA
(ATTRIBUTE INFORMATION, DATA VALUE)
PLANT A
PLANT B
PLANT C 10
CI SERVER
RISK MANAGEMENT
IMPLEMENT OPTIMUM OPERATION
DATA BELONGING TO GROUP 1
DATA BELONGING TO GROUP 2
PROVIDE DATA
CLASSIFY DATA BASED ON ATTRIBUTE INFORMATION
○ATTRIBUTE INFORMATION = ATTRIBUTE OF PLANT → GROUP 1
○ATTRIBUTE INFORMATION = ATTRIBUTE OF OPERATION → GROUP 2
ACQUIRE DATA
(ATTRIBUTE INFORMATION, DATA VALUE)
PLANT A
PLANT B
PLANT C

INFORMATION PROCESSING APPARATUS, PLANT CONTROL METHOD, AND NON-TRANSITORY COMPUTER-READABLE RECORDING MEDIUM

CROSS-REFERENCE TO RELATED APPLICATION

The present application claims priority to Japanese Patent Application No. 2022-057324 filed in Japan on Mar. 30, 2022. The contents of this application are incorporated herein by reference in their entirety.

BACKGROUND

Technical Field

The present invention relates to an information processing apparatus, a plant control method, and a non-transitory computer-readable recording medium.

Description of the Related Art

In various plants using petroleum, petrochemicals, chemical substances, gas, or the like, various measures are implemented in order to perform a safe operation. For example, a monitoring technology for monitoring various devices, such as equipment, devices, and sensors, that are used for operations of the plants, a simulation technology for predicting a state of each of the plants or calculating a control value for performing operation control of each of the plants by using actual measurement values or the like of various devices, and the like are known.

Patent Document 1: Japanese Laid-open Patent Publication No. 2020-064674

Patent Document 2: Japanese Laid-open Patent Publication No. 2021-057894

Patent Document 3: Japanese Laid-open Patent Publication No. 2002-32274

SUMMARY

According to one or more embodiments, an information processing apparatus includes a processor configured to acquire, from a device that is used for an operation of a plant, data that is related to the operation of the plant and to which attribute information indicating a state of the device has been assigned, classify the data by each of the pieces of attribute information assigned to the acquired data, and perform the operation of the plant by using the data associated with each of the pieces of classified attribute information.

According to one or more embodiments, a plant control method that causes a computer to execute a process including acquiring, from a device that is used for an operation of a plant, data that is related to the operation of the plant and to which attribute information indicating a state of the device has been assigned, classifying the data by each of the pieces of attribute information assigned to the acquired data, and performing the operation of the plant by using the data associated with each of the pieces of classified attribute information.

According to one or more embodiments, a non-transitory computer-readable recording medium stores therein a plant control program (or plant control instructions) that causes a computer to execute a process including acquiring, from a device that is used for an operation of a plant, data that is related to the operation of the plant and to which attribute information indicating a state of the device has been assigned, classifying the data by each of the pieces of attribute information assigned to the acquired data, and performing the operation of the plant by using the data associated with each of the pieces of classified attribute information.

BRIEF DESCRIPTION OF THE DRAWINGS

FIG. 5 is a diagram illustrating an access right DB;

FIG. 6 is a diagram illustrating a security level DB;

FIG. 7 is a diagram illustrating a provision information DB;

FIG. 8 is a diagram illustrating data provision performed based on attribute information;

FIG. 9 is a diagram illustrating simulation control performed based on the attribute information;

FIG. 10 is a diagram illustrating a mode determination performed based on the attribute information;

FIG. 11 is a diagram illustrating a statistical process based on the attribute information;

DESCRIPTION OF THE EMBODIMENTS

Figure 1:
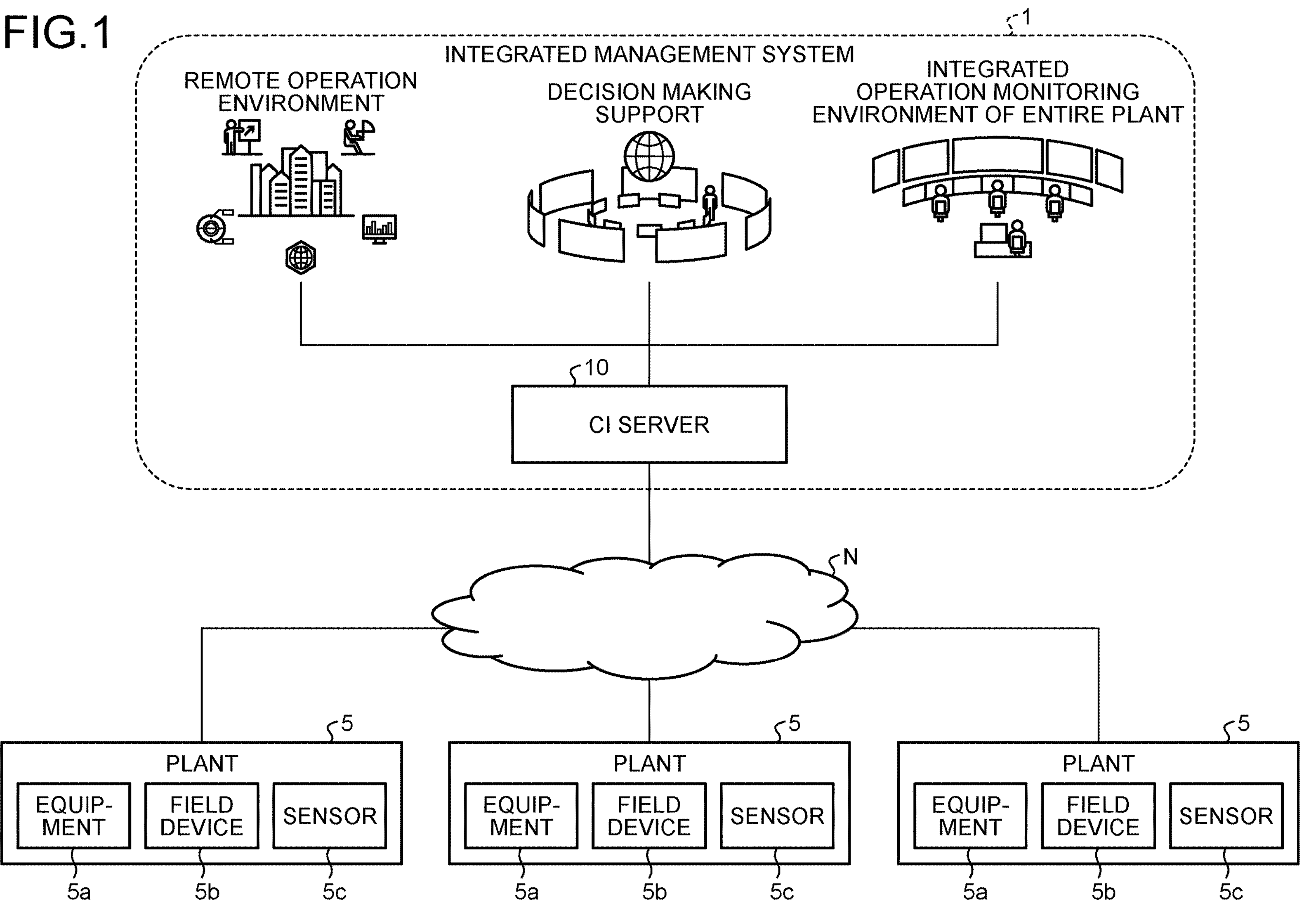
FIG. 1 is a diagram illustrating an example of the overall configuration of an integrated management system according to one or more embodiments.

Incidentally, in many plants, in order to perform a safe operation, information or the like that is used for monitoring items and a simulation is set in advance, and, in addition, data leakage, access control, and the like are appropriately managed on the basis of an advanced security policy. In contrast, in a plant, a review of an operation plan or the like is carried out due to various factors, such as an installation environment, a situation of supply and demand, and a variation in a raw material cost. Of course, due to the review of the operation plan or the like, a setting change of the monitoring item, variables of the simulation, or the like is performed, and the safe operation of the plant is maintained.

In this way, in the plant, there is a need to perform the safe operation while taking into consideration not only an internal factor, such as aged deterioration of a device or the like, but also an external factor; however, the technology described above is limited to monitoring previously set items or limited to a simulation performed by using data that is set in advance as an input, so that there may be a case of an insufficient state related to the safe operation following the situation of the plant, and there is thus still room for improvement.

One or more embodiments provide a technological improvement over conventional technologies. In particular, an information processing apparatus, a plant control method, and a non-transitory computer-readable recording medium according to one or more embodiments may efficiently and safely manage an operation of a plant in many aspects. This provides a practical, technological improvement over conventional technologies that would be readily appreciated by those skilled in the art. Further details regarding the various improvements and advantages will become apparent from the descriptions that follow.

Embodiments of an information processing apparatus, a plant control method, and a computer-readable recording medium will be described in detail below with reference to the accompanying drawings. Furthermore, the present invention is not limited to the embodiments. In addition, the same components are denoted by the same reference numerals and an overlapping description will be omitted. Each of the embodiments can be used in any appropriate combination as long as they do not conflict with each other.

Overall Configuration

FIG. 1 is a diagram illustrating an example of the overall configuration of an integrated management system 1 according to one or more embodiments. As illustrated in FIG. 1, the integrated management system 1 includes a CI server 10, and is connected to each of a plurality of plants 5 via a network N. Furthermore, various communication networks, such as a leased line, the Internet, or a long term evolution (LTE) network, may be used for the network N.

The integrated management system 1 is a system that integrally manages the plurality of plants 5, and is able to be implemented by a physical server, or is able to be implemented by a virtual machine or the like that uses a cloud system.

The CI server 10 is an example of an information processing apparatus that is connected to various devices included in each of the plants 5 and that integrally manages these devices. Specifically, the CI server 10 implements provision of a remote operation environment, provision of a service for a decision making support, provision of an integrated operation monitoring environment of the entire of the plants.

Furthermore, the remote operation environment provides, for each of the plants 5, a monitoring system that manages a state of the plant or the like, and provides a service, such as a report of an alarm or a notification to an operator. The decision making support simulates, for each of the plants 5, a state of the plant 5 and a control value in the plant 5, and provides a service, such as operation control of the plant 5 or a notification to an operator, on the basis of the simulation result. The integrated operation monitoring environment integrally monitors the plurality of plants 5, and provides a service, such as management of product materials produced by the plants, supply control, and cost management, in all of the plurality of plants 5. In this way, the CI server 10 is able to implement an alarm report to a designated user, transmission of various kinds of information, optimization of information management of the overall production activity, and a safe and effective operation support.

Each of the plants 5 is an example of various plants using petroleum, petrochemicals, chemical substances, gas, or the like, and includes a factory or the like that is provided with various facilities for obtaining product materials. Examples of the product materials include liquefied natural gas (LNG), a resin (plastic, nylon, etc.), and chemical substance products. Examples of the facilities include a factory facility, a machine facility, a production facility, an electric-generating facility, a storage facility, and a facility in a wellhead for mining petroleum, natural gas or the like.

Each of the plant 5 is constituted by using a distributed control systems (DCS) or the like that is not illustrated, and in which operation control of equipment 5*a*, a field device 5*b*, a sensor 5*c* or the like is performed. For example, the control system included in each of the plants 5 uses process data that is used in the respective plants 5, and performs various kinds of control on a control device, such as the field device 5*b*, that is installed in the equipment targeted for the control, an operation device that is associated with the equipment targeted for the control, or the like.

In addition, the equipment 5*a* includes, for example, an alarm device, such as a speaker, that outputs a warning, a conveying path that is used to convey the product material produced in the plant 5, and the like. The field device 5*b* includes a valve, a pump, a fan, and the like that are driven by a motor, an actuator, or the like. The sensor 5*c* includes a device, such as a pressure sensor, a temperature sensor, a flow rate sensor, a pH sensor, a velocity sensor, and an acceleration sensor, that acquires, detects, and measures, for example, a physical amount.

In addition, the data generated in the plant 5 and collected by the CI server 10 includes control data, such as a process value PV, a set value SV, a manipulation value MV, and the like. The process value PV is data indicating a state of a process performed in the plant 5. The process value PV is acquired by, for example, the associated field device 5*b*. An example of the process value PV includes a pressure, a temperature, a flow rate, a pH value, a velocity, and an acceleration.

The set value SV is data (target value) that indicates the target of the process value PV in the plant 5. The set value SV is given to the simulation that performs operation control of, for example, the plant 5, and is used for control of the plant 5. An example of the set value SV includes, similarly to the process value PV, a pressure, a temperature, a flow rate, a pH value, a velocity, and an acceleration. The manipulation value MV is data indicating a manipulation performed in the plant 5. The manipulation value MV is acquired from, for example, the associated field device 5*b*, or is provided to the field device 5*b* after the simulation has been performed. The field device 5*b* works in accordance with the provided manipulation value MV. An example of the manipulation value MV includes an amount of manipulation of the valve (for example, a degree of opening of the valve), an amount of manipulation of the pump, and an amount of manipulation of the fan.

With this system configuration, the CI server 10 acquires, from various devices, such as the equipment 5*a*, the field device 5*b*, and the sensor 5*c*, that are used for the operation of the plant 5, the data that is related to the operation of the plant 5 and to which attribute information indicating the state of the device is assigned. Then, the CI server 10 classifies the data by each of the pieces of attribute information assigned to the acquired data, and performs the operation of the plant 5 by using the data associated with each of the pieces of classified attribute information.

Figure 2:
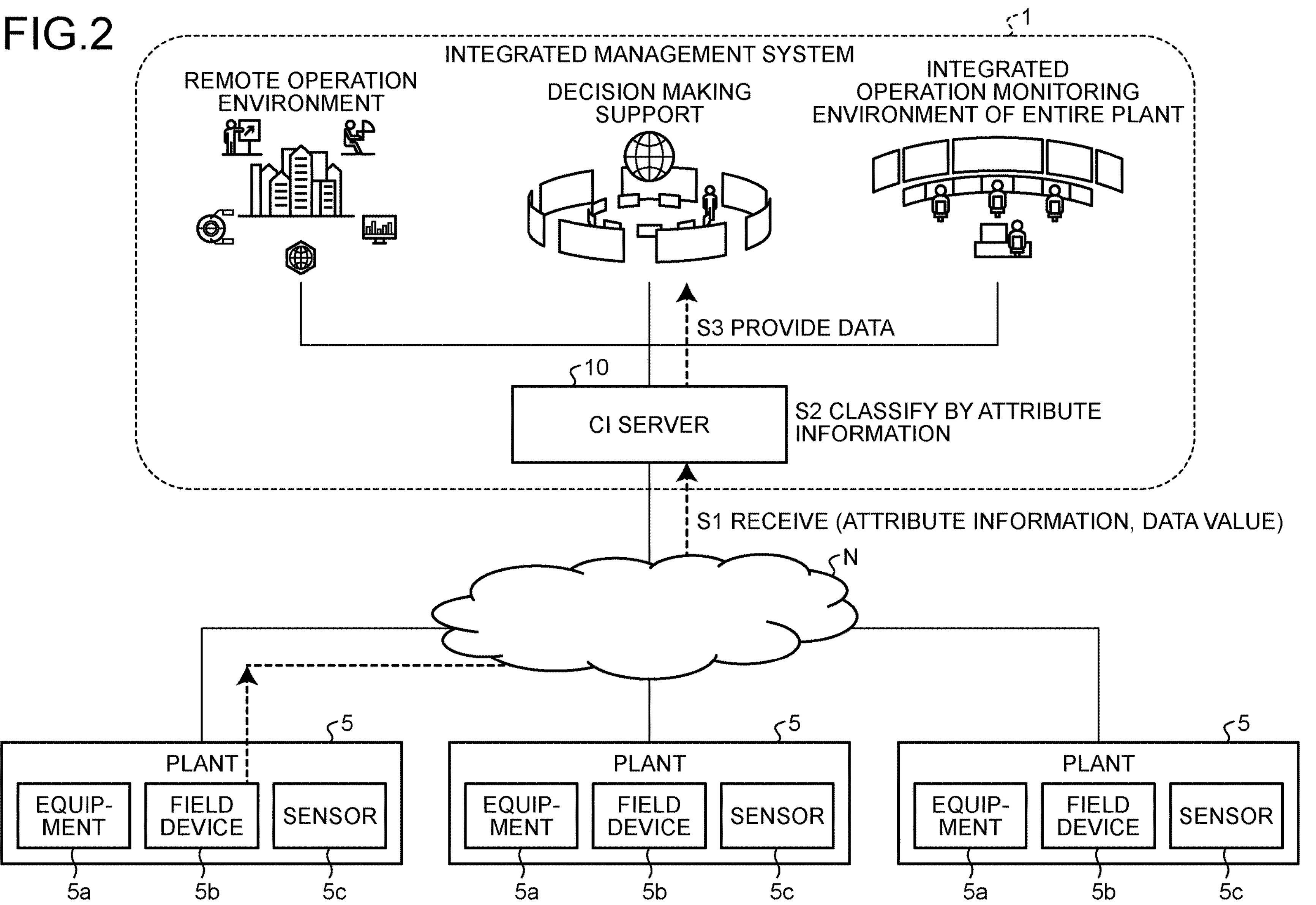
FIG. 2 is a diagram illustrating the flow of a process performed in the integrated management system.

FIG. 2 is a diagram illustrating the flow of a process performed in the integrated management system 1. As illustrated in FIG. 2, the CI server 10 receives data including "the attribute information and the data value" from the field device 5*b* included in the plant 5 (S1).

Then, the CI server 10 classifies the data by using the "attribute information" that is included in the reception data. For example, the CI server 10 performs, in accordance with the attribute information, determination of the provision destination on the basis of the security level of the data, specifying of a system that is able to provide the data, determination of suitability of a simulation that performs control of the plant 5, or the like, and classifies the data (S2).

After that, the CI server 10 provides the data on the basis of the classification result (S3). For example, if a state of the reception data indicated by the attribute information is an alarm, such as a "warning", the CI server 10 outputs the reception data to a remote operation environment. Furthermore, if the security level indicated by the attribute information is equal to or lower than a threshold and the data is able to be provided to an outside of the plant 5, the CI server 10 outputs the reception data to the integrated operation monitoring environment. In addition, if the reception data indicates that the attribute information is acquired at normal time of the device, the CI server 10 determines that the attribute information is applicable to the simulation, and outputs the reception data to the decision making support service.

In this way, the CI server 10 is able to automatically perform control of providing data in accordance with the attribute information assigned to the data received from the plant 5, so that the CI server 10 is able to distribute needed information to a needed service while maintaining confidentiality of each of the plants 5, and is able to safely and efficiently manage the operation of the plant from various aspects.

Functional Configuration

Figures 3, 4:
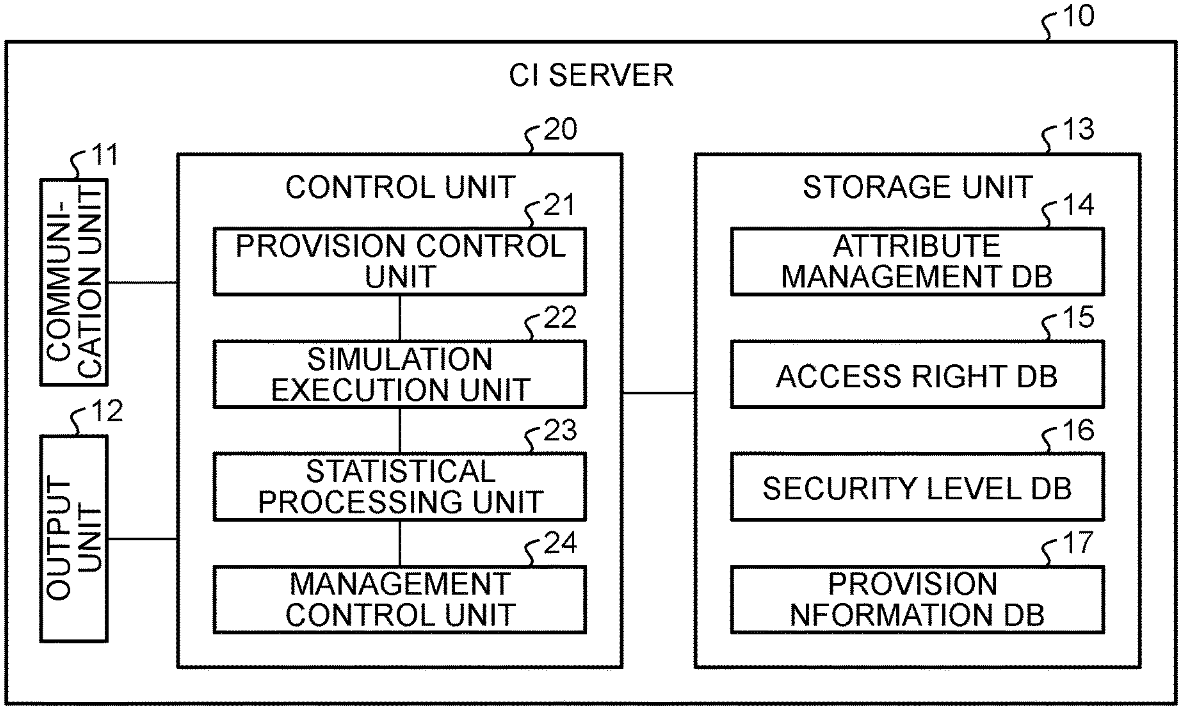
FIG. 3 is a functional block diagram illustrating a functional configuration of a CI server.
FIG. 4 is a diagram illustrating an attribute information DB.

FIG. 3 is a functional block diagram illustrating a functional configuration of the CI server 10. Furthermore, here, as an example, a case in which the CI server 10 implements provision of a remote operation environment, provision of a service for a decision making support, provision of an integrated operation monitoring environment of the entire of the plants will be described; however, each of the services may be performed by individual devices.

As illustrated in FIG. 3, the CI server 10 includes a communication unit 11, an output unit 12, a storage unit 13, and a control unit 20.

The communication unit 11 is a processing unit that controls communication with another device and is implemented by, for example, a communication interface or the like. For example, the communication unit 11 receives data to which the attribute information is assigned by the device included in each of the plants 5, and transmits the reception data to a predetermined provision destination.

The output unit 12 is a processing unit that performs output control of various kinds of information and is implemented by, for example, a display, a touch panel, or the like. For example, the output unit 12 is used to provide a remote operation environment, provides a monitoring screen for each of the plants 5, displays the reception data on the monitoring screen, and reports an alarm.

The storage unit 13 is a processing unit that stores therein various kinds of data, a program (or instructions) executed by the control unit 20, or the like and is implemented by, for example, a memory, a hard disk, or the like. The storage unit 13 stores therein setting information that is set in advance in order to perform data classification. For example, the storage unit 13 stores therein an attribute management DB 14, an access right DB 15, a security level DB 16, and a provision information DB 17.

The attribute management DB 14 stores therein information that is specified by the attribute information. FIG. 4 is a diagram illustrating the attribute management DB 14. As illustrated in FIG. 4, the attribute management DB 14 stores therein items of "attribute information, device information, and plant information". The "attribute information" indicates the attribute information that is assigned to the data, the "device information" indicates the device that has output the data and that is the acquisition source of the data, and the "plant information" indicates the plant to which the device that has output the data belongs.

The example illustrated in FIG. 4 indicates that the attribute information starting from "S-A1" is the sensor included in a plant A, and the attribute information starting from "D-A1" is the device included in a plant D. Furthermore, the information indicated here is only an example and setting thereof may arbitrarily be changed. For example, a data type indicating the process value PV, the set value SV, and the manipulation value MV, a specific product name, a specific model number, or the like may be associated with the information.

The access right DB 15 stores therein access right for each plant. FIG. 5 is a diagram illustrating the access right DB 15. As illustrated in FIG. 5, the access right DB 15 stores therein items of "plant information, a security level, and an access right". The "plant information" is information that indicates a plant. The "security level" indicates the security level of the plant, and is set by using three stages of, for example high, medium, and low. The "access right" indicates an access right to be assigned to a plant.

In the example illustrated in FIG. 5, setting has been made such that the security level of the "plant A" is "high", and the plant A is permitted to access various kinds of data and to perform "reading of data (Read) and writing of data (Write)". The setting has been made such that the security level of the "plant B" is "low", and the plant B is permitted to access various kinds of data and is permitted to only perform "reading of data (Read)". In addition, the setting may be performed for each unit or each area in the plant, instead of a unit of plant.

The security level DB 16 stores therein the security level of the attribute information. FIG. 6 is a diagram illustrating the security level DB 16. As illustrated in FIG. 6, the security level DB 16 stores therein, in an associated manner, the "attribute information" and the "security level". The "attribute information" indicates the attribute information that is assigned to the data, and the "security level" indicates the security level of the attribute information and is indicated by using three stages of, for example, high, medium, and low.

The example illustrated in FIG. 6 indicates that a "high" security level is set to the attribute information "S-SA10", and a "medium" security level is set to the attribute information "C2000". That is, as the data is further internally used data and is further undesirable to be provided outside, such as the data directly linked to the operation of the plant or the data indicating detailed setting of the plant, the data is managed under a more strict security condition.

The provision information DB 17 stores therein information related to the provision destination of the data. FIG. 7 is a diagram illustrating the provision information DB 17. As illustrated in FIG. 7, the provision information DB 17 stores therein, in an associated manner, items of "a security level, a provision destination, and permission content". The "security level" indicates the security level of the attribute information, and is set by using three stages of, for example, high, medium, and low. The "provision destination" indicates the provision destination of the data, and the "permission content" indicates permission content with respect to the data.

The example illustrated in FIG. 7 indicates that the data with the "security level" of "high" is able to be provided to only the same plant, and is permitted to perform only reading (Read) of that data. The data with the "security level" of "medium" is able to be provided to the integrated monitoring, and is permitted to perform reading (Read) of that data and is permitted to be provided to the outside. In this way, the setting has been made such that the data with the security level of "high" is able to be used inside the plant and editing or the like using the data is not permitted. Regarding the data with the security level of "medium", the setting has been made such that the data is able to be used outside the plant and editing or the like using the data is not permitted. Regarding the data with the security level of "low", the setting has been made such that the data is able to be used outside the plant and editing or the like using the data is permitted.

A description will be given here by referring back to FIG. 3. The control unit 20 is a processing unit that manages the entire of the CI server 10, and is implemented by, for example, a processor or the like. The control unit 20 includes a provision control unit 21, a simulation execution unit 22, a statistical processing unit 23, and a management control unit 24. For example, the provision control unit 21, the simulation execution unit 22, the statistical processing unit 23, and the management control unit 24 are implemented by, for example, an electronic circuit included in the processor or a process or the like that is executed by the processor. Each of the processing units included in the control unit 20 refers to the various DBs stored in the storage unit 13, and performs the process described later.

Control of External Provision Performed Based on Attribute Information

The provision control unit 21 is a processing unit that classifies reception data by each of the pieces of attribute information in the case where the provision control unit 21 receives the data, and that controls a data provision to the outside of the plant 5 for each of the pieces of classified attribute information. Specifically, the provision control unit 21 provides, in accordance with the security level DB 16 illustrated in FIG. 6, the permitted "permission content" and the reception data to the permitted provision destination.

FIG. 8 is a diagram illustrating a data provision performed on the basis of the attribute information. Furthermore, the plant A, the plant B, and a plant C illustrated in FIG. 8 and the subsequent drawings have the same function as that of the plant 5. As illustrated in FIG. 8, if the provision control unit 21 receives or acquires data on "attribute information (AAA), and a data value (PPP)" from the plant A, the provision control unit 21 refers to the security level DB 16 and specifies that the security level of the attribute information (AAA) is "high".

Subsequently, the provision control unit 21 refers to the provision information DB 17, and specifies that the provision destination of the data with the security level of "high" is within the "same plant" and has the permission content of "Read". As a result, the provision control unit 21 transmits the "data value (PPP) and the permission content (Read)" to only the monitoring system that is associated with the plant A and that monitors the plant A that is the transmission source of the data.

Here, an example in which the provision destination of the data is distinguished for each of the pieces of data has been described; however, the example is not limited to this. For example, the provision control unit 21 is also able to control the entire of the plants, or perform control in a unit of attribute, such as an area or a unit. In addition, the provision control unit 21 is also able to perform control of data provision on the basis of security management performed on the basis of an accessing worker, the attribute of the group in which the worker belongs, or location information on the worker. For example, in a case illustrated in FIG. 8, the provision control unit 21 provides the data to the worker who is present in the area of the plant A, and prevents provision of data with respect to the worker who is present outside the area of the plant A even if the worker is in charge of the duty of the plant A.

Furthermore, the provision control unit 21 is also able to perform access control of writing or the like by using the access right DB 15 or the like. For example, in the example illustrated in FIG. 5, regarding the access to the reception data, the provision control unit 21 permits an operator or an administrator belonging to the plant A to both of "writing" and "reading" the reception data.

The example is not limited to this. The provision control unit 21 is also able to perform control availability of a change in an output value, a set value, a mode, or the like for the purpose of troubleshooting or an operational improvement, or able to perform control of writing from the outside. For example, the provision control unit 21 further greatly inhibits writing performed from the outside as the security level is higher, whereas the provision control unit 21 permits a use as a measure for the operational improvement because of high importance information. In contrast, as the security level is lower, the provision control unit 21 further permits writing from the outside, whereas the provision control unit 21 prevents the reception data from being unused for the operational improvement because of low importance information.

Application Control of Simulation Performed Based on Attribute Information

The simulation execution unit 22 is a processing unit that performs simulation for each plant or simulation covering the entire of the plant and that performs operation control of the plant. Specifically, if the simulation execution unit 22 receives data to which the attribute information indicating the status of the device, such as normal, abnormal, or uncertain, has been assigned, the simulation execution unit 22 excludes abnormal and uncertain data and performs a simulation when the simulation execution unit 22 performs the simulation for calculating the control data related to the operation of the plant.

For example, the simulation execution unit 22 uses the data (the process value PV, etc.) and an online simulation, and calculates a calculation value for controlling the plant. The calculation value is, for example, the set value SV, the manipulation value MV, or the like, and is written to various control devices by the control system or the like that controls the plant. Then, the written calculation value is reflected on control of the plant. In addition, as an analysis capable for monitoring the plant, the simulation execution unit 22 makes a prediction of, for example, an alarm that possibly occur in the future, and transmits an analysis result to a monitoring terminal or the like.

Furthermore, the simulation includes an online simulation that performs a simulation in real time, a simulation that predicts a plant state on the basis of a batch process, or the like. For these simulations, a physical model, modeling, or the like may be used, and a simulated plant (mirror plant) associated with the plant may be used. The simulated plant is subjected to modeling to have the same configuration, the same state, and the like as those of the plant, and operates to follow the state of the plant on the basis of the data that is acquired in real time. Various online simulations using the simulated plant are known; therefore, a description thereof in detail will be omitted here.

FIG. 9 is a diagram illustrating simulation control performed on the basis of the attribute information. As illustrated in FIG. 9, the provision control unit 21 receives or acquires, from the plant A, data A1 indicating "attribute information (normal), a data value (PP1)" and data A2 indicating "attribute information (uncertain), a data value (PP5)". Subsequently, regarding the data A1, the attribute information is "normal", so that the provision control unit 21 determines that the data A1 is the data that is acquired in the course of a normal operation. In contrast, regarding the data A2, the attribute information is "uncertain", so that the provision control unit 21 determines that the data A2 is data that is acquired in a state that is not in the course of normal operation even though in an abnormal state, such as in an idling state, in a predetermined period of time after a failure recovery, or in a non-operational state of the plant.

Consequently, the simulation execution unit 22 prevents the data value "PP5" that is included in the data A2 indicating "uncertain" from being input to the simulation, and performs a simulation using the data value "PP1" included in the data A1 indicating "normal".

Furthermore, the simulation execution unit 22 is able to remove uncertain data, complement the removed data with different data, and use the obtained data in the simulation. For example, if data in a device that is in operation is "uncertain" from among redundant devices, the simulation execution unit 22 is able to acquire data from a standby device and perform a simulation after complementing the data. At this time, regarding the "abnormal" data is usually operated in a standby state instead of an operation state, and the standby data is acquired as "normal" data by the simulation execution unit 22. Furthermore, the simulation execution unit 22 may complement data obtained from the same device that is used for safety. In addition, the simulation execution unit 22 is also able to generate complement data from normal data that is present before and after, for example, a pipe.

Determination Control of MAN Mode Performed Based on Attribute Information

Furthermore, the simulation execution unit 22 is able to control an input of data to the online simulation that performs a simulation in real time on the basis of a control mode of a device. For example, the simulation execution unit 22 specifies, on the basis of the attribute information, whether control of the device is performed by a MAN mode that indicates a manual control or by automatic control (Auto mode). The simulation execution unit 22 is also able to perform the online simulation by excluding data associated with the MAN mode when the simulation execution unit 22 performs a simulation for calculating the control data related to the operation of the plant.

The operation of the plant is usually performed in an automatic operation, a behavior of the plant in the future is predicted, on the basis of the online simulation, by using the data at the time of an automatic operation, and then, control of various devices is performed such that a safe operation is performed in accordance with the prediction result. In contrast, at the time of failure occurrence, alarm detection, maintenance, or the like, an automatic operation is sometimes temporarily stopped and a device is manually operated. Therefore, to use data associated with the MAN mode for the online simulation for performing an automatic operation may possibly result in a decrease in the accuracy of the simulation. Accordingly, the simulation execution unit 22 determines, on the basis of the attribute information, the mode of the device in which the data has been measured, and determine applicability to the online simulation.

FIG. 10 is a diagram illustrating mode determination performed on the basis of the attribute information. As illustrated in FIG. 10, the simulation execution unit 22 receives data B3 and data B5 from the plant B. The simulation execution unit 22 acquires the attribute information "MAN" included in the data B3, and specifies that the data B3 is data that is measured at the time of manual operation. Similarly, the simulation execution unit 22 acquires the attribute information "Auto" included in the data B5, and specifies that the data B5 is data that is measured at the time of automatic operation.

The simulation execution unit 22 uses the obtained result and performs data classification on the data to be input to the online simulation. Specifically, the simulation execution unit 22 prevents a data value "MM3" included in the data B3 indicating the attribute information "MAN" from being used for the online simulation, and then, uses the data value "BB3" included in the data B5 indicating the attribute information "Auto" for the online simulation and performs an accurate simulation.

Here, the MAN mode is focused in order to exclude that data for one thing, and in order to increase automation because of difficulty in its control or because an unautomated factor is present.

Accordingly, as illustrated in FIG. 10, the simulation execution unit 22 is able to specify, as a portion operated in the MAN mode, a device, a time zone, a range of the plant, or the like, performs a simulation using only the MAN mode, and determine whether or not the device is to be shifted to the automatic operation (Auto mode) on the basis of the obtained result.

For example, if the result of the simulation that is performed by using only the MAN mode indicates a normal operation, the simulation execution unit 22 determines that the automatic operation is available, and makes the shift to control that is performed on the basis of the normal simulation result.

For example, if the range of the MAN mode is the time zone, the simulation execution unit 22 performs a simulation using the data associated with the Auto mode in a predetermined period of time before and after the time zone, and generates time series data of the simulation result of the Auto mode, the simulation result of the MAN mode (or an actual measurement value), and the simulation result of the Auto mode. If a variation in time series data, such as a slope of, for example, an approximate straight line, is less than a predetermined value, the simulation execution unit 22 is also able to determine that the automatic operation is available.

Furthermore, the simulation execution unit 22 performs a simulation by purposely using the data associated with the MAN mode, grasps a plant performance indicating that "the status is not in normal operation (Auto mode)", but "the device status is normal", and is able to make good use of performance management. For example, the simulation execution unit 22 acquires data on a process that leads to the MAN mode at the time of activation or stop of a thermal power plant (operated using a steam power technology) and performs a simulation, so that the simulation execution unit 22 is able to acquire the data in a low load time zone, in which, for example, a power output is equal to or less than 15% of a rating, that is not operated in the normal operation. Consequently, an operator or a developer is able to grasp that a normal operation is available even if the power output is equal to or less than 15% of the rating, which is not able to be acquired under normal circumstances.

Statistical Process Performed Based on Attribute Information

The statistical processing unit 23 is a processing unit that performs a statistical process by using the data in which the attribute information is assigned. Specifically, the statistical processing unit 23 classifies the reception data, in accordance with the attribute information, and distributes each of the pieces of reception data to statistical processes of generation of a key performance indicator (KPI) or a performance index, life prediction of a device or the like, investigation of the cause of abnormality, assessment of the situation of replacement parts, and the like.

FIG. 11 is a diagram illustrating the statistical process performed on the basis of the attribute information. As illustrated in FIG. 11, if the statistical processing unit 23 receives data, the statistical processing unit 23 refers to the attribute information, and specifies the status, such as during an operational work, a specific operation situation, a power-up or a power-down, during a trial run, in a stopped state, idling, or the like.

For example, if the statistical processing unit 23 calculates a KPI indicating the operating efficiency or the energy efficiency including the thermal efficiency, an energy consumption rate, a emission coefficient of carbon dioxide, or the like, it is requested to calculate the KPI during the operational work. Therefore, in order to prevent a difficulty in evaluation or comparison of the KPI, the statistical processing unit 23 excludes the state in a power-up operation, a specific operation situation (during troubleshooting, a low load operation, etc.), or the like, extracts the data obtained during the operational work, and uses the data to calculate the KPI. Furthermore, the status indicating during operational work includes a commercial operation, a normal operation, and the like.

For example, if the statistical processing unit 23 predicts, for example, the life of the equipment, the device, the sensor, or the like, the statistical processing unit 23 performs a simulation by using the data in which weighting is applied by using an operation situation or a load. Therefore, the statistical processing unit 23 uses the data that is obtained during operational work from among the pieces of reception data without any change, and, in contrast, applies weighting on the data that is during a specific operation, such as in a stopped state, in a troubleshooting state, or in a low load operation state, and then, performs life prediction by performing the simulation. That is, the statistical processing unit 23 classifies, by using the attribute information, each of the pieces of reception data into data corresponding to an item or a condition that is regarded as important in the statistical process and data that is regarded as unimportant, and improve the accuracy of the statistical process.

For example, the statistical processing unit 23 uses a specific operation situation during an output of an alarm or an alert and performs a trouble analysis. Therefore, the statistical processing unit 23 extracts, from among the pieces of reception data, the data that is obtained in a state of a specific operation, such as a stopped state, a troubleshooting state, a low load operation state, or the like.

For example, if the statistical processing unit 23 performs replacement of parts of the device due to troubleshooting, maintenance, or the like, the statistical processing unit 23 needs to determine whether the device is able to shift to the normal operation by using a trial run. Therefore, the statistical processing unit 23 extracts, from among the pieces of reception data, data obtained in a trial run state or an idling state, and determines that the device is able to shift from the trial run to the normal operation in the case where the operation is continued within a range of the normal value on the basis of the simulation performed by using the extracted reception data of on the basis of a time series variation in the extracted reception data.

Risk Management Performed Based on Attribute Information

The management control unit 24 is a processing unit that specifies, in accordance with the attribute information assigned to the reception data, the attribute of the plant in which the data has been measured and the situation of the device, and that makes good use of execution of risk management or implementation of an optimum operation.

Figure 12:
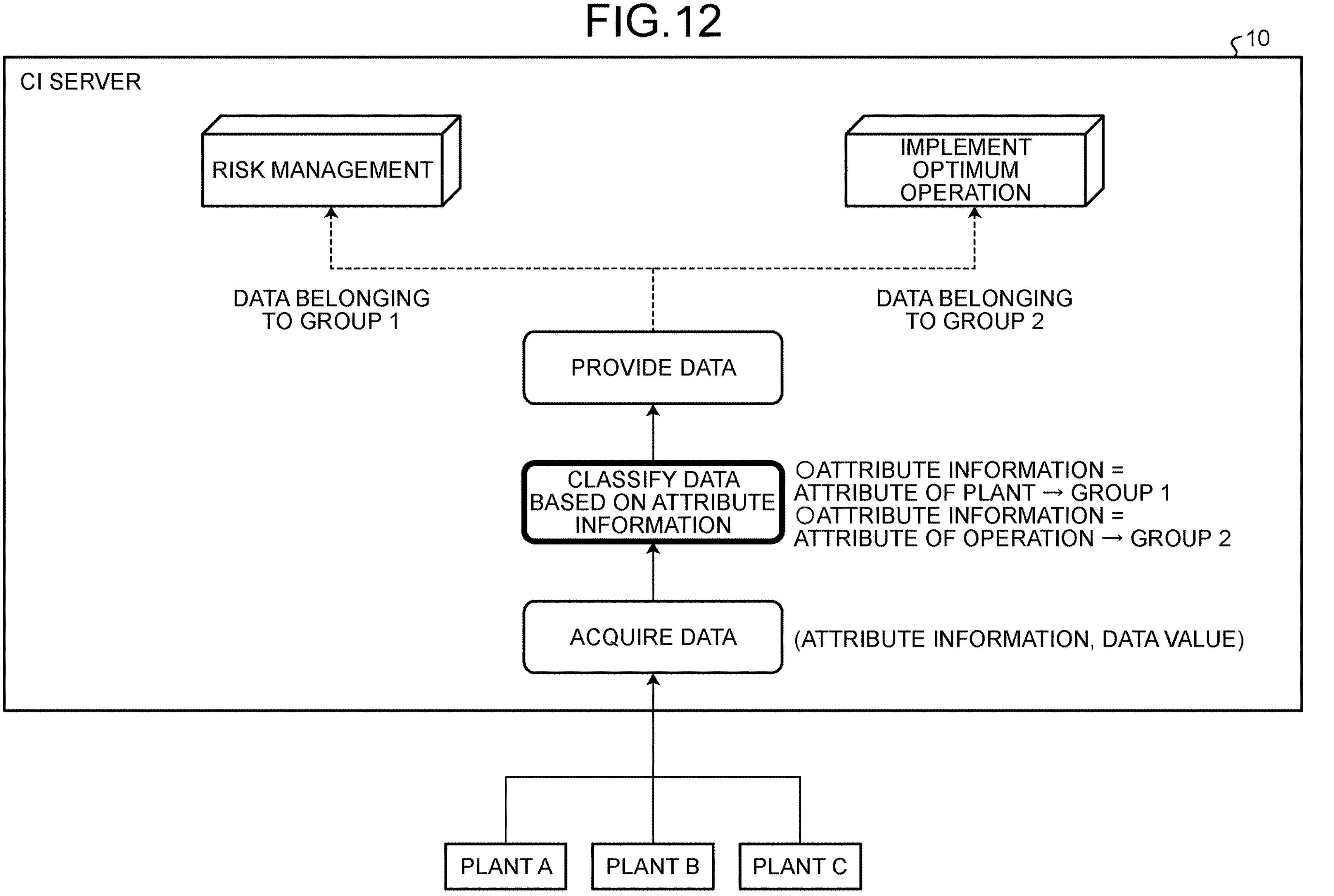
FIG. 12 is a diagram illustrating risk management performed based on the attribute information.

FIG. 12 is a diagram illustrating risk management performed on the basis of the attribute information. As illustrated in FIG. 12, if the management control unit 24 receives data, the management control unit 24 refers to the attribute information, and classifies the data associated with the plant attribute indicating information related to infrastructure, a level of danger, effect to an environment, or the like into a group 1. Furthermore, if the management control unit 24 receives data, the management control unit 24 refers to the attribute information, and classifies data associated with the operation attribute that indicates a situation of the device, such as a vibration, a temperature, or a deviation, a period of time after an installation, or an operation load of the device, such as the current operation load, into a group 2.

The management control unit 24 uses the data classified into the group 1, and performs management control including risk control, maintenance of security, and information management. For example, the management control unit 24 predicts, on the basis of the simulation or on the basis of a comparison with past data, a human risk caused by a high temperature, a low temperature, a breathing difficulty due to a lack of oxygen, aspiration of a harmful substance, a fire, or the like; a hazardous risk caused by a fire or an explosion due to a combustible material, such as gas or oil, or the like; or a contamination risk caused by a hazardous substance, a poisonous substance, or the like. Furthermore, if this type of risk occurs, the management control unit 24 makes use of a function for safely stopping the operation of the plant, or takes measures to decrease a risk while maintaining the operation.

The management control unit 24 uses the data classified into the group 2, calculates an operation load of the plant on the basis of the situation of the device or the operation load, and performs a plant operation in accordance with the operation load. For example, if a calculation result obtained on the basis of the simulation or the like indicates that a load applied to a certain device continues a level equal to or greater than a threshold in a predetermined period of time, the management control unit 24 determines that the operation load of the plant is high and performs control such that the operation load of the plant is decreased. For example, as a method for controlling the operation load to be decreased, an output is sometimes decreased in the case where it is predicted that nitrogen oxides emitted from a thermal power plant exceeds the "total amount of regulation value per day" that is prescribed by the Air Pollution Prevention Law or an ordinance. In addition, in order to meet a demand of electrical power, control is performed such that the number of power plants in another region is increased, or a pumped storage power plant is put into operation.

Furthermore, if a value at the temperature sensor or a vibration sensor continues a level equal to or greater than a threshold in a predetermined period of time, if a decrease in a processing speed of each of the device belonging to a certain area continues in a predetermined period of time, or if an output amount of the plant is decreased even if an amount of the product material of the plant maintains a fixed value, the management control unit 24 determines that a load related to the infrastructure is high and continues the operation or maintains the output as much as possible. For example, if a plurality of lines or a plurality of pieces of equipment (for example, pumps) are installed, the management control unit 24 postpones a repair, and performs the operation by using the pieces of equipment (a line, a pump, etc.) that are operable even if some pieces of equipment are inoperable. Furthermore, in order to continue the operation or in order to secure an output (an amount of a product material) according to a request, the management control unit 24 causes aging equipment or a low efficient equipment that is not usually used to put into operation. That is, the management control unit 24 makes efficient use of the equipment with a low priority, or a loss-making equipment. More specifically, the management control unit 24 performs operation control on the aging equipment by decreasing a level of, for example, a pressure as an upper limit.

Flow of Process

Figure 13:
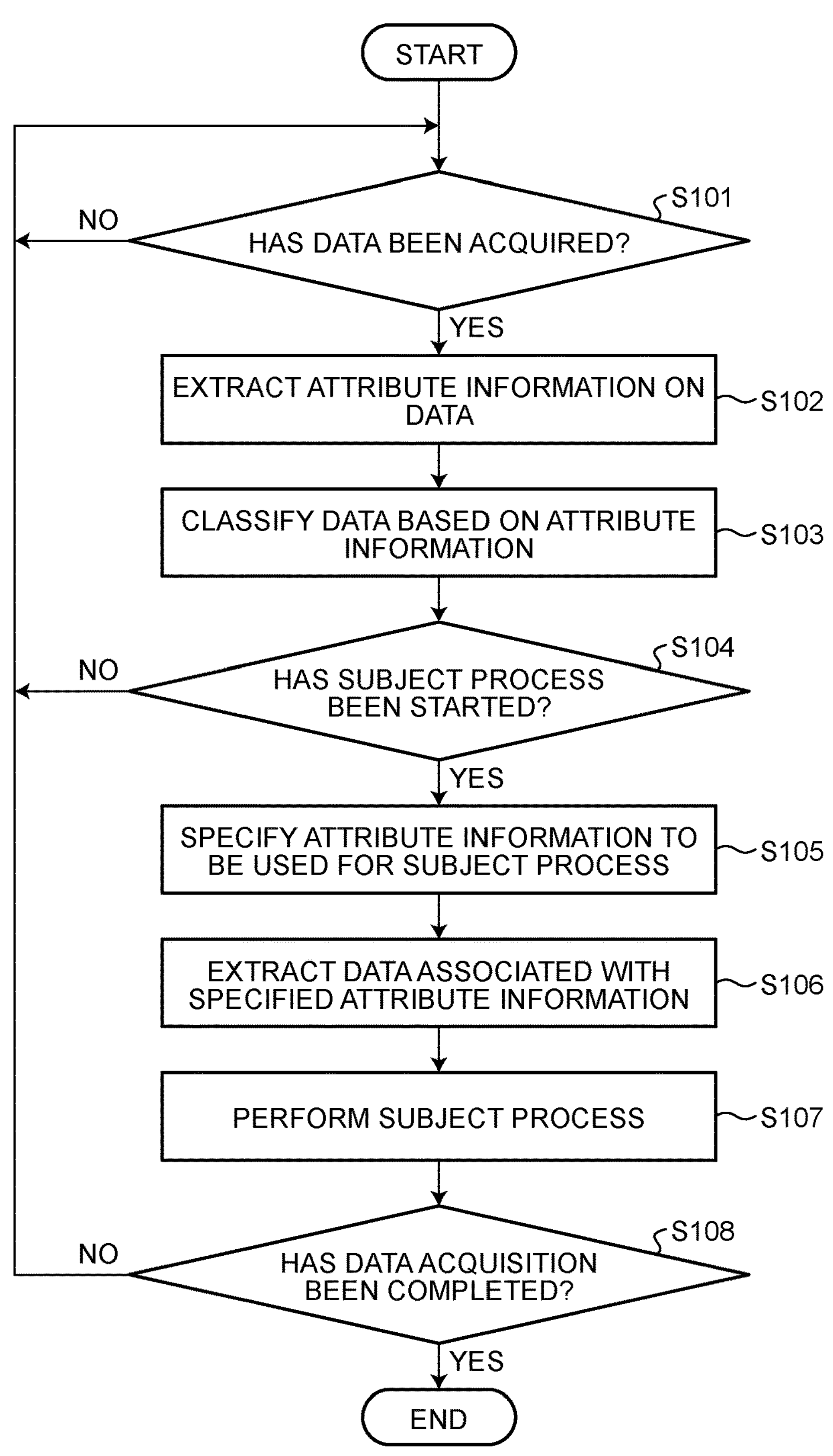
FIG. 13 is a flowchart illustrating the flow of the process according to one or more embodiments.

FIG. 13 is a flowchart illustrating the flow of a process according to one or more embodiments. As illustrated in FIG. 13, if the CI server 10 acquires or receives data (Yes at Step S101), the CI server 10 extracts the attribute information that is assigned to the data (Step S102).

Subsequently, the CI server 10 classifies the data on the basis of the attribute information (Step S103). Here, if the CI server 10 does not start the subject process (No at Step S104), the CI server 10 repeats the process at Step S101 and the subsequent process. In contrast, if the CI server 10 starts the subject process (Yes at Step S104), the CI server 10 specifies the attribute information that is used for the subject process (Step S105).

Then, the CI server 10 extracts the data associated with the specified attribute information from the storage unit 13 or the like (Step S106), and performs the subject process (Step S107). Here, if the CI server 10 continues to acquire data (No at Step S105), the CI server 10 repeats the process at Step S101 and the subsequent processes, and, in contrast, if the CI server 10 completes the data acquisition (Yes at Step S105), the CI server 10 completes the process.

Effects (Technological Improvements)

As described above, the CI server 10 is able to determine applicability without referring to the data acquired from the plant, and is able to implement an appropriate use of the data. Therefore, the CI server 10 is able to safely and efficiently manage the operation of the plant from various aspects while guaranteeing various kinds of security of the plant.

The CI server 10 is able to determine whether the reception data is applicable to the simulation performed on the basis of the attribute information, so that the CI server 10 is able to implement the simulation performed by excluding unneeded data. Therefore, the CI server 10 is able to implement a high-speed simulation with high accuracy while guaranteeing various kinds of security of the plant.

The CI server 10 is able to determine whether the reception data is applicable to the statistical process performed on the basis of the attribute information, so that the CI server 10 is able to classify only the data needed to the statistical process. Therefore, the CI server 10 is able to perform a high-speed statistical process with high accuracy while guaranteeing various kinds of security of the plant, and is able to generate the information that is useful for an operation plan of the plant.

The CI server 10 is able to determine whether the reception data is applicable to risk management or an optimization process performed on the basis of the attribute information, so that the CI server 10 is able to more strongly implement the safe operation of the plant. Therefore, the CI server 10 is able to perform risk avoidance, a change of an operation plan, or the like at a high speed with high accuracy while guaranteeing various kinds of security of the plant.

OTHER EMBODIMENTS

In the above explanation, a description has been given of the embodiments according to the present invention; however, the present invention may also be implemented with various kinds of embodiments other than the embodiments described above.

Value, etc.

The number of plant, the number of pieces of equipment, field devices, and sensors, the content of the integrated process, the specific example of the attribute information, and the like described above in the embodiments are only examples and are able to be changed. Furthermore, the order of the processes of the t described in the embodiments is also able to be changed as long as they do not conflict with each other.

Concealment

For example, as a technique for further guaranteeing the security of the data, it is also possible to use concealment of the data. For example, the CI server 10 acquires, from the plant 5, the attribute information and concealment data including a concealment value of the data. Then, the CI server 10 performs classification of the data by using the attribute information. In this way, the CI server 10 is able to implement an appropriate classification and provision of data on the basis of the attribute information without cancelling the concealment of data value even if the data is concealed.

System

The flow of the processes, the control procedures, the specific names, and the information containing various kinds of data or parameters indicated in the above specification and drawings can be arbitrarily changed unless otherwise stated. For example, the provision control unit 21, the simulation execution unit 22, the statistical processing unit 23, and the management control unit 24 may be constituted by different devices.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of each of the processing functions performed by the each of the devices can be implemented by a CPU and by programs analyzed and executed by the CPU or implemented as hardware by wired logic.

Hardware

Figure 14:
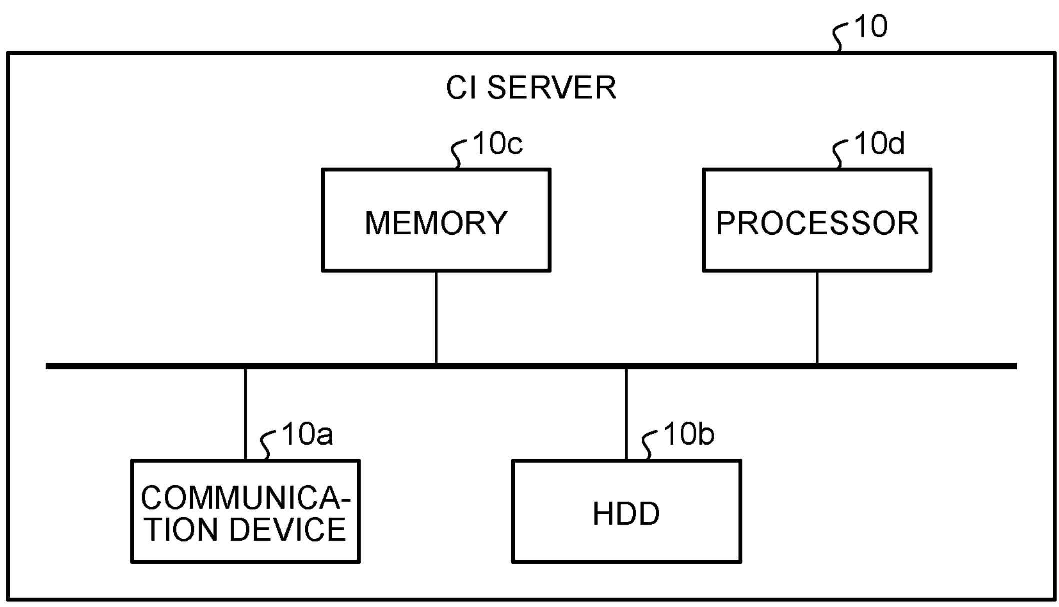
FIG. 14 is a diagram illustrating an example of a hardware configuration.

In the following, an example of a hardware configuration of a computer described in the embodiments will be described. FIG. 14 is a diagram illustrating an example of the hardware configuration. As illustrated in FIG. 14, the CI server 10 includes a communication device 10*a*, a hard disk drive (HDD) 10*b*, a memory 10*c*, and a processor 10*d*. Furthermore, each of the units illustrated in FIG. 14 is connected by a bus or the like with each other.

The communication device 10*a* is a network interface card or the like, and communicates with another server. The HDD 10*b* stores therein the programs and the DBs that operate the functions illustrated in FIG. 3.

The processor 10*d* operates the process that executes each of the functions described above in FIG. 3 or the like by reading the programs that execute the same process as that performed by each of the processing units illustrated in FIG. 3 from the HDD 10*b* or the like and loading the read programs in the memory 10*c*. For example, the process executes the same functions as those performed by each of the processing units included in the CI server 10. Specifically, the processor 10*d* reads, from the HDD 10*b* or the like, the programs having the same functions as those performed by the provision control unit 21, the simulation execution unit 22, the statistical processing unit 23, the management control unit 24, and the like. Then, the processor 10*d* executes the process for executing the same process as those performed by the provision control unit 21, the simulation execution unit 22, the statistical processing unit 23, the management control unit 24, and the like.

In this way, the CI server 10 is operated as an information processing apparatus that performs an information processing method by reading and executing the programs. Furthermore, the CI server 10 is also able to implement the same functions as those described above in the embodiments by reading the above described programs from a recording medium by a medium reading device and executing the read programs. In addition, the programs described in one or more embodiments are not limited to be executed by the CI server 10. For example, the embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to an aspect of the embodiments, it is possible to safely and efficiently manage the operation of the plant in many aspects.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a processor that:
acquires, from a device for an operation of a plant, data that is related to the operation of the plant and to which one of pieces of attribute information indicating a state of the device has been assigned;
classifies the acquired data into one of the pieces of attribute information based on the attribute information assigned to the acquired data; and
operates the plant by using the data classified into one of the pieces of attribute information,
wherein
the pieces of attribute information include information indicating either a situation of the device in which the data has been measured or an operation load of the device,
the processor further:
calculates an operation load of the plant based on the situation of the device or the operation load of the device, and
operates the plant in accordance with the operation load of the plant, and
the processor further, when either the situation of the device or a load related to an infrastructure of the plant specified by the situation of the device is equal to or greater than a threshold:
causes unused aging equipment or low efficient equipment to operate, and
decreases the load applied to the plant while maintaining production of a product material according to a request from a client with respect to the plant.

2. A method comprising:
acquiring, from a device for an operation of a plant, data that is related to the operation of the plant and to which one of pieces of attribute information indicating a state of the device has been assigned;
classifying the acquired data into one of the pieces of attribute information based on the attribute information assigned to the acquired data;
operating the plant by using the data classified into one of the pieces of attribute information, wherein
the pieces of attribute information include information indicating either a situation of the device in which the data has been measured or an operation load of the device;
calculating an operation load of the plant based on the situation of the device or the operation load of the device;
operating the plant in accordance with the operation load of the plant; and
when either the situation of the device or a load related to an infrastructure of the plant specified by the situation of the device is equal to or greater than a threshold:
causing unused aging equipment or low efficient equipment to operate, and
decreasing the load applied to the plant while maintaining production of a product material according to a request from a client with respect to the plant.

3. A non-transitory computer-readable medium (CRM) storing instructions that cause a processor to execute operations comprising:
acquiring, from a device for an operation of a plant, data that is related to the operation of the plant and to which one of pieces of attribute information indicating a state of the device has been assigned;
classifying the acquired data into one of the pieces of attribute information based on the attribute information assigned to the acquired data;
operating the plant by using the data classified into one of the pieces of attribute information, wherein
the pieces of attribute information include information indicating either a situation of the device in which the data has been measured or an operation load of the device;
calculating an operation load of the plant based on the situation of the device or the operation load of the device;
operating the plant in accordance with the operation load of the plant; and
when either the situation of the device or a load related to an infrastructure of the plant specified by the situation of the device is equal to or greater than a threshold:

causing unused aging equipment or low efficient equipment to operate, and decreasing the load applied to the plant while maintaining production of a product material according to a request from a client with respect to the plant.

* * * * *